April 17, 1962  C. E. JOHNSON  3,029,584
ENDLESS CUTTING ASSEMBLY
Filed April 20, 1960  2 Sheets-Sheet 1

INVENTOR.
Clarence E. Johnson
BY
Victor J. Evans & Co.
Attorneys

April 17, 1962  C. E. JOHNSON  3,029,584
ENDLESS CUTTING ASSEMBLY
Filed April 20, 1960  2 Sheets-Sheet 2

INVENTOR.
Clarence E. Johnson
BY
Victor J. Evans & Co
Attorneys

United States Patent Office 3,029,584
Patented Apr. 17, 1962

3,029,584
ENDLESS CUTTING ASSEMBLY
Clarence E. Johnson, Rte. 4, Box 100A, Arkadelphia, Ark.
Filed Apr. 20, 1960, Ser. No. 23,519
5 Claims. (Cl. 56—291)

This invention relates to agricultural equipment, and more particularly to a chain link sickle bar.

The object of the invention is to provide a chain link sickle bar which is adapted to be used for various types of cutting or mowing operations, as for example when weeds, standing crops or the like are being cut or harvested.

Another object of the invention is to provide a chain link sickle bar which can be operated in either of several different directions and wherein a more improved or more efficient cutting action is provided which is in the nature of a shearing action between movable cutter knives and stationary cutting blades, and wherein the parts are constructed so that the movable knives cannot be lifted from the stationary cutter blades by grass, weeds or the like.

Another object of the invention is to provide a chain link sickle bar which is constructed so that vibration is reduced and also loss of power is minimized since according to the present invention a continuous motion is utilized, and wherein the mechanism of the present invention can be attached to a suitable unit such as a tractor or the like.

A further object of the invention is to provide a chain link sickle bar which is extremely simple and inexpensive to manufacture.

Other objects and advantages will be apparent in the course of the following description.

In the accompanying drawings, forming a pair of this application, and in which like numerals are used to designate like parts throughout the same.

Figure 1:
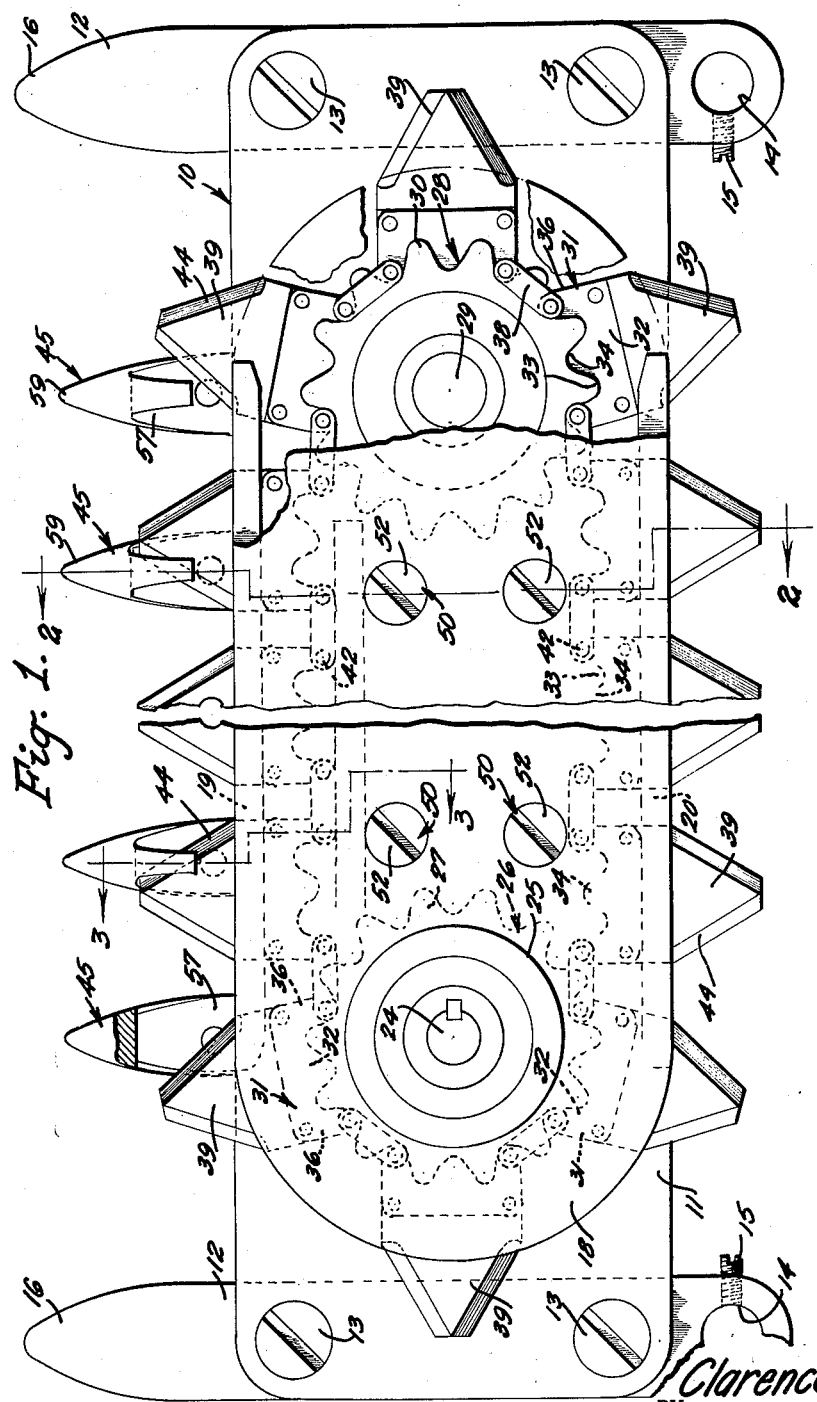
FIGURE 1 is a top plan view of the chain link sickle bar of the present invention, with parts broken away and in section.

Referring in detail to the drawings, the numeral 10 indicates the chain link sickle bar of the present invention which is shown to comprise a horizontally disposed base 11, and connected to the lower outer end portions of the base 11 are guard members 12, and these guard members 12 are adapted to be fastened to the base 11 by means of securing elements 13. The rear ends of the guards 12 are provided with openings 14 whereby extension arms from a tractor or the like can be connected to the members 12, and set screws 15 are provided for holding the guards 12 connected to said extension arms. The front ends of the guards 12 are generally pointed as indicated by the numeral 16, and the lower front surface is upwardly rounded or shaped arcuately as indicated by the numeral 17.

Figure 2:
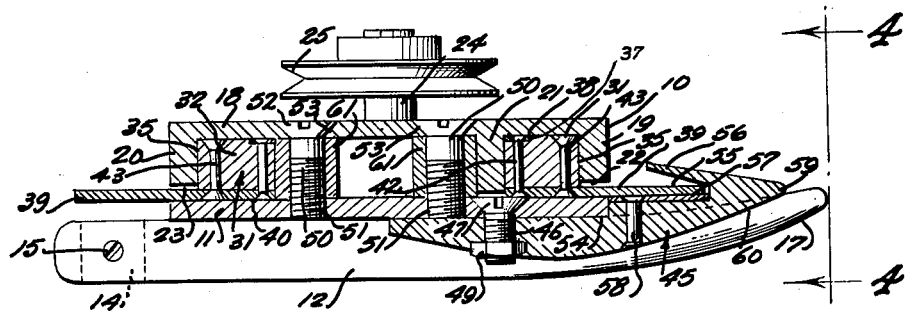
FIGURE 2 is a sectional view taken on the line 2—2 of FIGURE 1.

Arranged above the base 11 is a cover 18, and depending from the horizontally disposed cover 18 are vertically disposed spaced parallel front, rear, and intermediate bars or wall members 19, 20 and 21. As shown in FIGURE 2 for example the lower end of the wall member 19 is spaced upwardly from the base 11 so as to provide a clearance space 22 for a purpose to be later described. Similarly there is a clearance space 23 between the bottom of the wall member 20 and the rear of the base 11. The numeral 24 indicates a vertically disposed drive shaft which extends through the cover 18, and the shaft 24 has a pulley 25 thereon, and the pulley 25 is adapted to have an endless belt trained thereover, and such a belt may be connected to the power take-off of the tractor or other equipment with which the present invention is being used. Interposed between the cover 18 and base 11 is a drive sprocket 26, and the sprocket 26 is connected to the lower or inner end of the shaft 24 so that as the pulley 25 is rotated from the power source, the sprocket 26 will likewise be rotated or turned. The sprocket 26 is provided with a plurality of spaced apart teeth 27 on its outer periphery.

The numeral 28 indicates an idler sprocket which is spaced from the drive sprocket 26, and the idler sprocket 28 is interposed between the cover 18 and base 11, the sprocket 28 being mounted on an idler shaft 29, and the sprocket 28 is also provided with a plurality of spaced apart teeth 30.

The numeral 31 indicates an endless chain which comprises a plurality of spaced apart similar blocks 32, and each of the blocks 32 has on its inner surface a plurality of undulations 33 which define on the inner portions of the blocks 32 teeth 34 for engaging the teeth 27 and 30 of the sprockets 26 and 28 respectively. The ends of the blocks 32 are flat as indicated by the numeral 36, and the outer portion of each block is also flat as indicated by the numeral 35.

Figure 3:
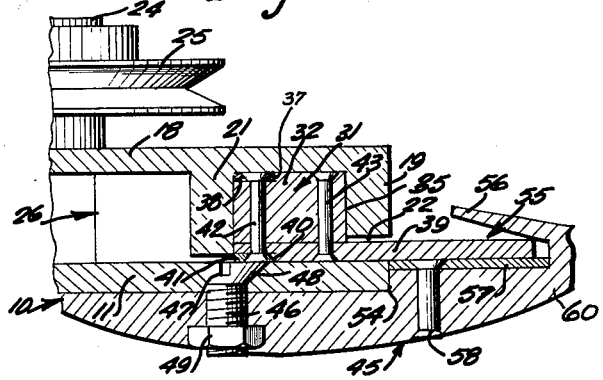
FIGURE 3 is a sectional view taken on the line 3—3 of FIGURE 1.
Figure 4:
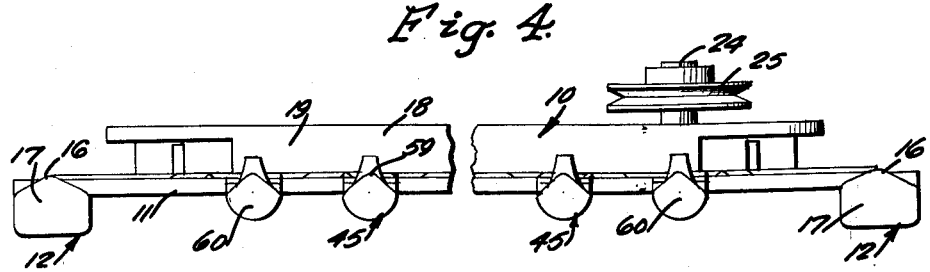
FIGURE 4 is a view taken generally on the line 4—4 of FIGURE 2.

The upper inner end portions of the blocks 32 are recessed or cutaway as indicated by the numeral 37, and the numeral 38 indicates links which are arranged in engagement with the recessed portions 37, FIGURE 3. There is further provided a plurality of movable cutting knives 39 which are mounted below the blocks 32, and the knives 39 are provided with lower inner recessed or cutaway portions 40, and links 41 engage the recessed portions 40 and suitable securing elements such as the pivot pins or rivets 42 serve to pivotally connect the ends of the links 38 and 41 to the blocks and cutting knives respectively. It will be seen that there is provided one of the knives 39 for each of the blocks 32, and the knives 39 are fastened to the blocks 32 by means of securing elements 43. As shown in the drawings each knife 39 has a pair of angularly arranged cutting edges 44. These cutting knives are adapted to pass through the celarance spaces 22 and 23 when the mechanism is actuated, as for example as shown in FIGURE 2. The outer portion of each of the cutting knives has a generally triangular shape or formation, as for example as shown in FIGURE 1.

There is further provided a plurality of spaced apart ledger plates 45 which extends forwardly from the front portion of the base 11, and these ledger plates 45 are fastened to the base 11 by means of securing elements or bolts 46 which have their upper ends or heads 47 seated in counter-sunk openings 48, and nuts 49 are arranged in threaded engagement with the lower ends of the bolts 46.

As shown in FIGURE 2, the cover 18 is fastened to the base 11 by means of bolts or screws 50 which have their lower threaded ends engaging threaded apertures or openings 51 in the base 11, and the heads 52 of the screws 50 are seated in countersunk openings 53 in the cover 18.

The guard fingers or ledger plates 45 are provided with recessed or cutaway portions 54 that snugly receive or engage the front portion of the base 11, FIGURE 2. Each of the ledger plates 45 includes a notched portion 55 which defines a projecting portion 56, and fastened to each ledger plate 45 is a stationary cutting blade or ledger plate 57, the blades 57 being secured to the ledger plates 45 by means of securing elements 58. The front ends of the ledger plates 45 are generally pointed as indicated by the numeral 59, and the lower surfaces of the ledger plates 45 are shaped arcuately as indicated by the numeral 60.

As shown in FIGURE 2 for example, spacer members or collars 61 are interposed between the cover 18 and base 11, and the screws 50 extend through the spacer collars 61.

As shown in FIGURE 1 for example the ends of the bars or wall members 19, 20 and 21 are arranged so that their ends terminate short of the ends of the cover 18.

From the foregoing, it is apparent that there has been provided a chain link sickle bar, and with the parts arranged as shown in the drawings, it will be seen that the openings 14 in the members 12 provide a means whereby the mechanism 10 can be conveniently attached to a tractor or the like through the medium of suitable brackets or extension arms. The power take-off from the tractor may be connected to the medium of a suitable endless belt to the pulley 25 so that the pulley 25 can be selectively rotated and this rotation of the pulley 25 will rotate the shaft 24 which in turn will drive the sprocket 26. Since the chain 31 is trained over the sprocket 26, and since the chain 31 is also trained over the sprocket 28, it will be seen that this will result in rotation of the sprocket 28 at the same time.

The endless chain 31 comprises the plurality of similar blocks 32 which have teeth such as the teeth 34 that mesh with the teeth 27 and 30 of the sprockets, and the blocks 32 are connected together by the links such as the links 38 and 41. A movable cutting knife 39 is fastened to each block 32, and the knives 39 have sharp cutting edges 44 and these knives are adapted to coact with the stationary cutter blades 57 whereby weeds, grass, crops or the like can be effectively cut off or severed or harvested.

It will be noted that as the chain 31 moves or travels, the knives 39 will pass over the stationary blades 57 and the knives will pass through the notches 55 in the ledger plates 45 so as to provide the desired cutting action.

The lower ends of the guards 12 are inclined or curved as indicated by the numeral 17, and the lower ends of the ledger plates 45 are shaped arcuately or curved as indicated by the numeral 60, and these members extend forwardly from the mechanism 10 and have their front ends generally pointed.

The cover 18 is arranged above the base 11, and the wall members 19 and 20 have their lower ends spaced slightly above the base 11 so as to define or provide clearance spaces 22 and 23 which permits the cutting knives 39 sufficient room or space to pass therethrough.

The ledger plates 45 are connected to the base 11 by means of the securing elements 46, and the cover and base are connected together by means of the securing elements 50. During the movement of the endless chain 31, it will be seen from FIGURE 1 for example that the blocks 31 will pass or move between the wall portions 19 and 20, and also the chain blocks 32 will pass inwardly with respect to the rear wall member 21.

The parts can be made of any suitable material and in different shapes or sizes.

The movable cutting knives 39 are fastened to the blocks 32, as for example by means of the securing elements or rivets 43. The sprockets are adapted to be fastened as for example by means of several keys to their respective shafts. The various securing elements are countersunk so as to present a flat surface. The spacing collars 61 permit the cutters to travel and yet be held down close to the base. The bars 19, 20 and 21 serve as guides for the endless chain, and in the front where the weed cutting action takes place, the two bars 19 and 21 are required to maintain the position of the cutting knives and blocks properly aligned, and after the cutting knives have passed over the drive sprocket, the knives return to a position contiguous to the idler sprocket and continue on to the front line to pass over the ledger plates 45 and cut the weeds as the machine moves forward over the ground and it will be seen that the weeds and grass will be brought between the cutting edges 44 of the moving knives 39 and the stationary blade 57 on the ledger plates 45, and the flush heads 47 of the securing elements 46 serve to fasten the ledger plates 45 to the base 11.

In the present invention the cutters are tightly held and an efficient shearing cutting action is achieved, and the stationary cutter blades are in very close contact with the moving knives so that the shearing action is accomplished. Thus, the position of the rigidly held cutting knives fastened to parallel sided blocks held front and back by parallel bars and held downward to the base by the adjustable type plate accomplishes a true and efficient cutting action because the moving cutter cannot be lifted from the stationary cutter (ledger plate) by the grass or weeds entering between the flat surfaces of the cutters. The portions 56 function as rock guards. The entire mechanism can be supported from a tractor or the like as for example support members from the tractor can be arranged in engagement with the openings 14. The flat head bolts or screws provide a smooth surface so that the cutters and blocks can slide over the ledger plates.

With the present invention extreme vibration will be reduced and also loss of power will be minimized by using a continuous motion in one direction instead of a conventional reciprocal moving sickle bar or mowing bar. The movable cutter knives have cutting edges 44 on both sides thereof. The pulley 25 can be placed on either right or left sprocket so as to drive the endless chain in a clockwise or counter-clockwise direction, or the knives may be provided with only one sharp edge and the driving pulley is adapted to then be fastened to whichever shaft is required to move the cutters over the stationary ledger plates therebelow. In actual practice the mechanism may be constructed so that a series of cutters such as twenty cutters are linked together and travel or slide over approximately ten ledger plates. The endless chain or continuous chain of knives and blocks makes a complete circuit between the parallel hold down bars 19, 20 and 21 and these members travel around the sprocket gears as previously stated. The flat surfaces together with the countersunk securing elements insure that the blocks and cutters can travel smoothly and wherein the parts will be held in their proper assembled positions. Increased spacing between the cutters can be accomplished by leaving off one or more of the cutter knives and retaining the block and links. The sickle bar can be operated from left to right or from right to left by reversing the belt and pulley on the driving shaft, or it can be driven from left or right by interchanging the pulley to the left or right shaft.

Minor changes in shape, size and rearrangement of details coming within the field of invention claimed may be resorted to in actual practice, if desired.

What is claimed is:

1. In a device of the character described, a horizontally disposed base, a horizontally disposed cover positioned above said base, spaced parallel vertically disposed front and rear and intermediate wall members depending from said cover, a drive shaft extending through said cover and having a pulley on its upper end, a drive sprocket interposed between said cover and base and connected to the lower end of said drive shaft, an idler sprocket interposed between said cover and base and spaced from said drive sprocket, each of said sprockets including a plurality of spaced apart teeth thereon, an endless chain sickle trained over said sprockets and comprising a plurality of spaced apart similar blocks each provided with a plurality of inner undulations defining teeth for engaging the teeth of said sprockets, the upper outer end portions of said blocks having recesses therein, links pivotally mounted in the recesses in said blocks, a movable cutter knife operatively secured below each of said blocks, the lower inner end portions of the cutters having recesses therein, links engaging said last named recesses, a plurality of spaced apart guard fingers fastened to said base and each of said guard fingers comprising a notched portion on its upper front end, and stationary cutting blades mounted in the notched portions of said guard fingers, said movable cutters passing over said stationary blades.

2. The structure as defined in claim 1 wherein said blocks and links pass between said front and intermediate wall members, and said blocks and links passing inwardly of said rear wall member.

3. The structure as defined in claim 1 and further including spacer collars interposed between said cover and base.

4. The structure as defined in claim 1 wherein there is provided a space between the front and rear wall members and the base and wherein such spaces provide clearance for the passage therethrough of the movable knives.

5. In a device of the character described, a horizontally disposed base, a horizontally disposed cover positioned above said base, spaced parallel vertically disposed front and rear and intermediate wall members depending from said cover, a drive shaft extending through said cover and having a pulley on its upper end, a drive sprocket interposed between said cover and base and connected to the lower end of said drive shaft, an idler sprocket interposed between said cover and base and spaced from said drive sprocket, each of said sprockets including a plurality of spaced apart teeth thereon, an endless chain sickle trained over said sprockets and comprising a plurality of spaced apart similar blocks each provided with a plurality of inner undulations defining teeth for engaging the teeth of said sprockets, the upper outer end portions of said blocks having recesses therein, links pivotally mounted in the recesses in said blocks, a movable cutter knife operatively secured below each of said blocks, the lower inner end portions of the cutters having recesses therein, links engaging said last named recesses, a plurality of spaced apart guard fingers fastened to said base and each of said guard fingers comprising a notched portion on its upper front end, stationary cutting blades mounted in the notched portions of said guard fingers, said movable cutters passing over said stationary blades, said blocks and links passing between the front and intermediate wall members, and said blocks and links also passing inwardly of the rear wall member, spacer collars interposed between said cover and base, there being spacers between the lower ends of the front and rear wall members which provide clearance for the passage therethrough of the movable knives, each of the movable knives including an outer portion having a generally triangular shape which is provided with angularly arranged cutting edges.

References Cited in the file of this patent
UNITED STATES PATENTS

| | | |
|---|---|---|
| 157,243 | Sweet | Nov. 24, 1874 |
| 374,397 | Clark | Dec. 6, 1887 |
| 726,392 | Bailey | Apr. 28, 1903 |